US010197847B2

(12) United States Patent
Sasaki et al.

(10) Patent No.: US 10,197,847 B2
(45) Date of Patent: Feb. 5, 2019

(54) LIQUID CRYSTAL DISPLAY DEVICE

(71) Applicant: Japan Display Inc., Minato-ku (JP)

(72) Inventors: Eri Sasaki, Tokyo (JP); Yasushi Kawata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 14 days.

(21) Appl. No.: 15/378,636

(22) Filed: Dec. 14, 2016

(65) Prior Publication Data

US 2017/0176814 A1 Jun. 22, 2017

(30) Foreign Application Priority Data

Dec. 18, 2015 (JP) ................................. 2015-247467

(51) Int. Cl.
*G02F 1/1335* (2006.01)
*G02F 1/1368* (2006.01)

(52) U.S. Cl.
CPC .. *G02F 1/133553* (2013.01); *G02F 1/133514* (2013.01); *G02F 2001/13685* (2013.01); *G02F 2001/133519* (2013.01); *G02F 2201/40* (2013.01)

(58) Field of Classification Search
CPC ......... G02F 1/133555; G02F 1/133371; G02F 1/133553; G02F 1/133514; G02F 2001/133519; G02F 2001/13685; G02F 2201/40

USPC ......................................................... 349/114
See application file for complete search history.

(56) References Cited

U.S. PATENT DOCUMENTS

| 2005/0225707 A1* | 10/2005 | Seo ................... G02F 1/133509 349/122 |
| 2008/0259259 A1* | 10/2008 | Otake ............... G02F 1/133555 349/117 |
| 2009/0147192 A1* | 6/2009 | Ishizaki ............... G02B 5/3083 349/117 |

FOREIGN PATENT DOCUMENTS

JP 2002-365664 12/2002

* cited by examiner

*Primary Examiner* — Nathanael R Briggs
*Assistant Examiner* — William Peterson
(74) *Attorney, Agent, or Firm* — Oblon, McClelland, Maier & Neustadt, L.L.P.

(57) ABSTRACT

According to one embodiment, a liquid crystal display device includes a first substrate, a second substrate including a color filter, and a liquid crystal layer. The first substrate includes a light-reflecting layer, a transparent conductive layer, an insulating layer, a first pixel electrode, and a second pixel electrode. The color filter includes a first color layer and a second color layer. A gap between the first pixel electrode and the second pixel electrode, the first color layer or the second color layer, the light-reflecting layer, the transparent conductive layer and the insulating layer are overlaid.

10 Claims, 9 Drawing Sheets

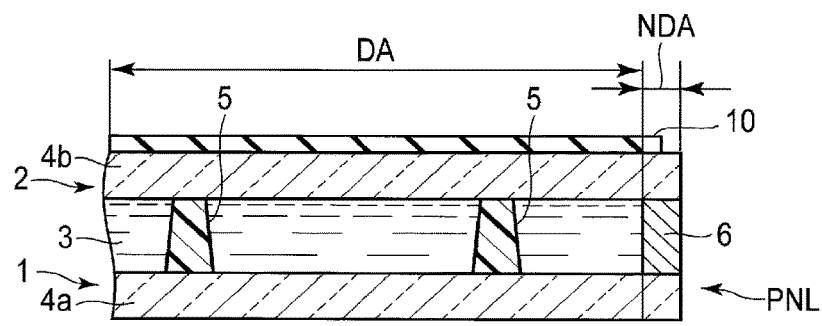
F I G. 2
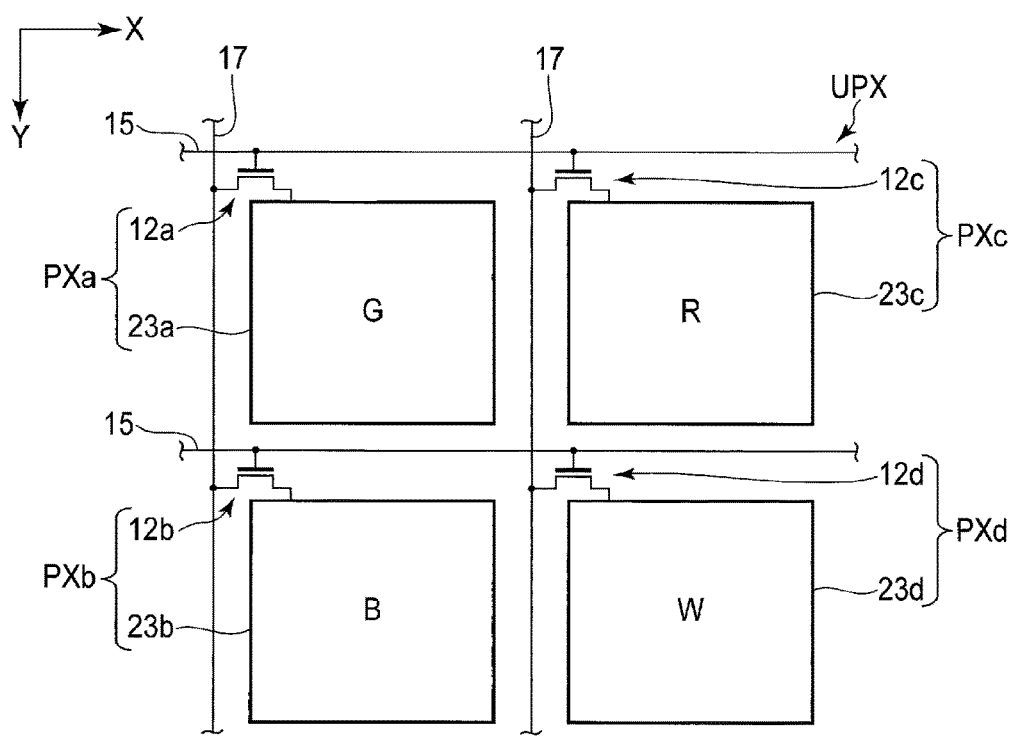
F I G. 4

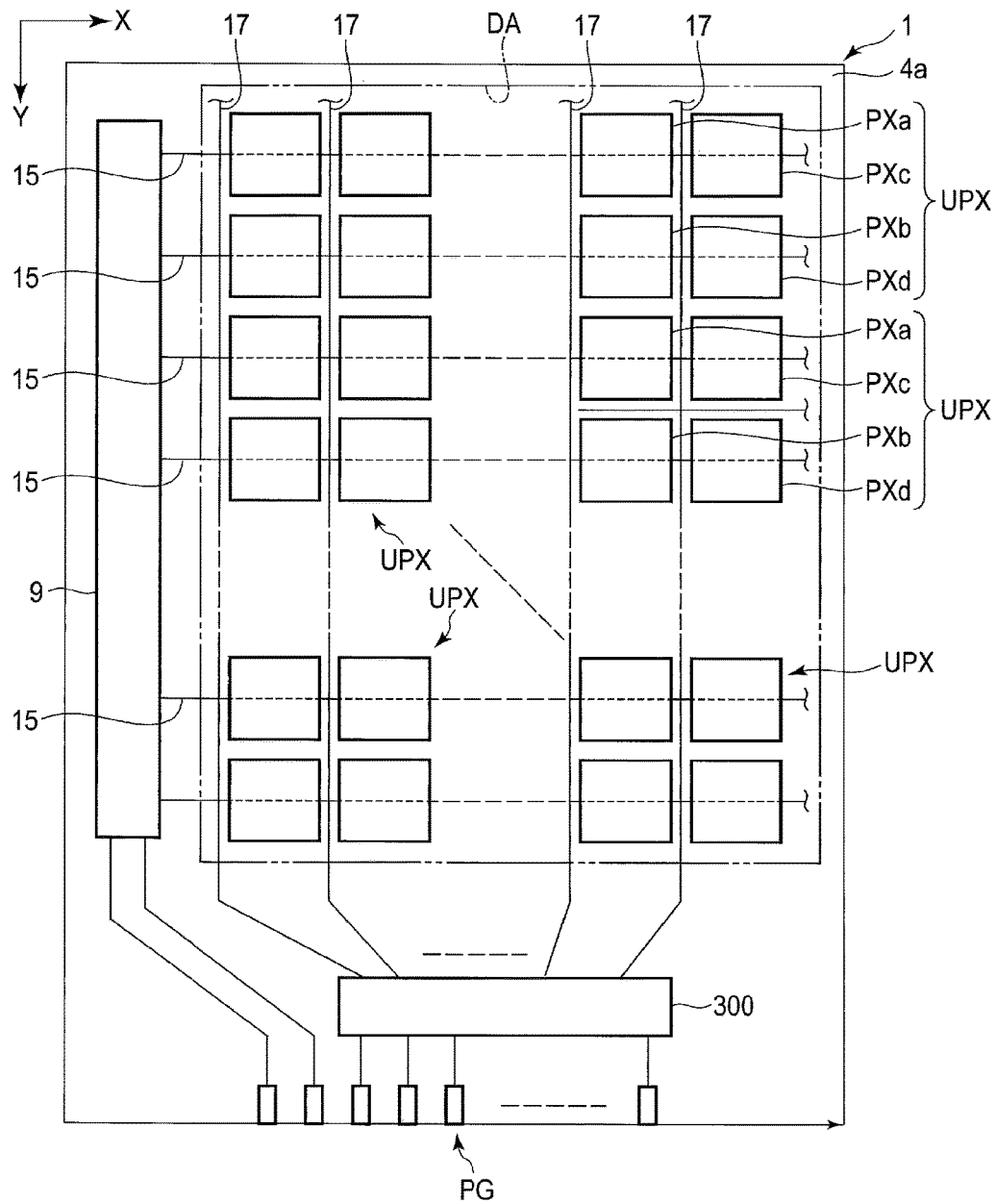
F I G. 3

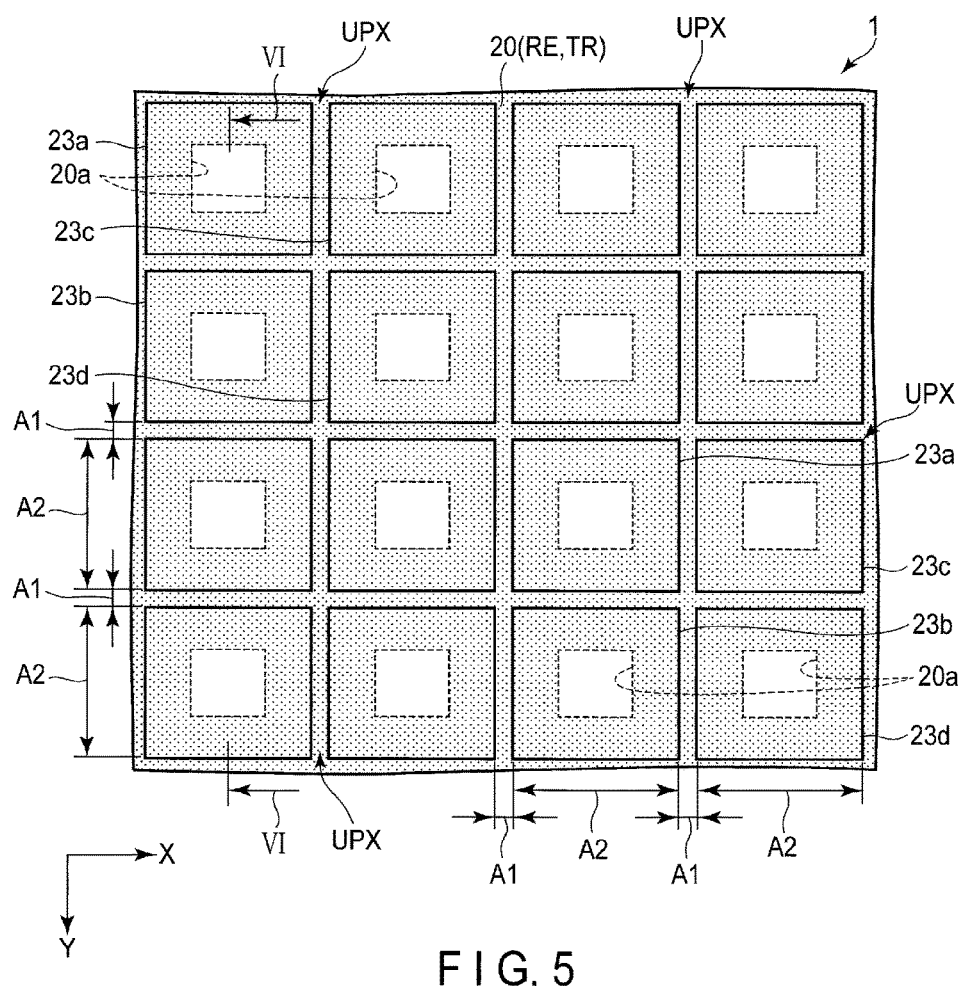
F I G. 5

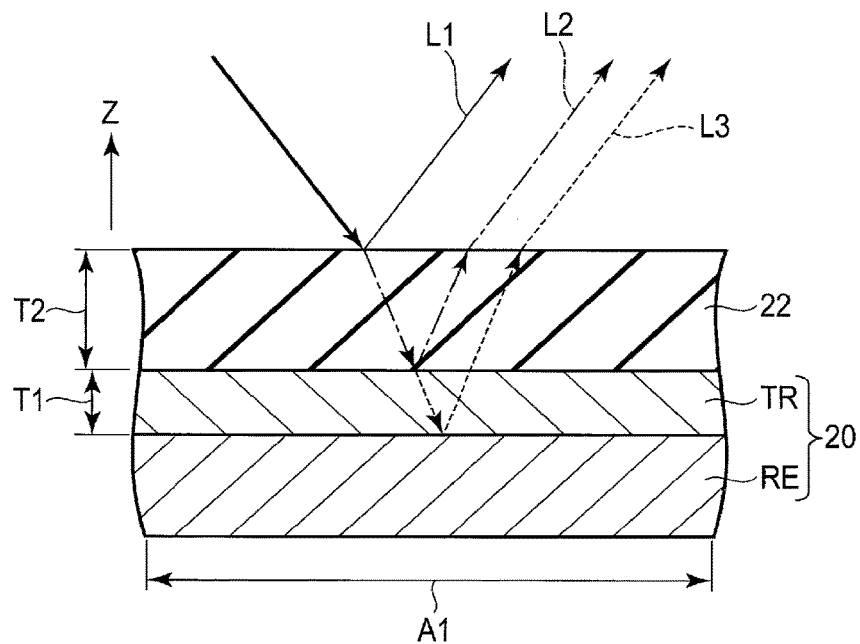
F I G. 8
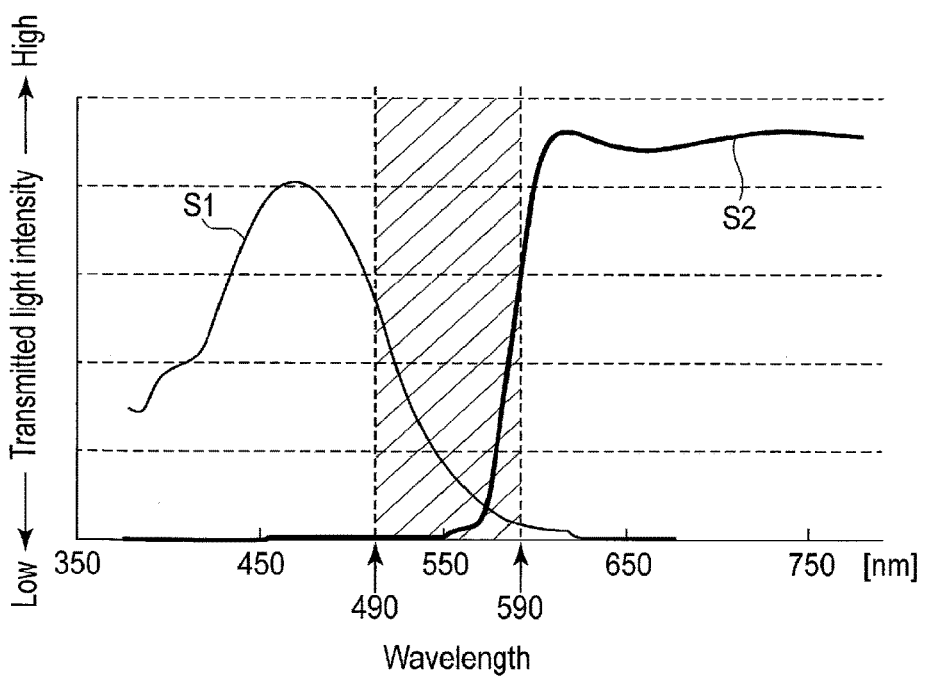
F I G. 9

|  | Thickness of transparent conductive layer [nm] | Thickness of fifth insulating film [nm] |
|---|---|---|
| Sample 1 | 20 | 150 |
| Sample 2 | 20 | 170 |
| Sample 3 | 20 | 190 |
| Sample 4 | 40 | 150 |
| Sample 5 | 40 | 170 |
| Sample 6 | 40 | 190 |
| Sample 7 | 60 | 150 |
| Sample 8 | 60 | 170 |
| Sample 9 | 60 | 190 |

F I G. 10

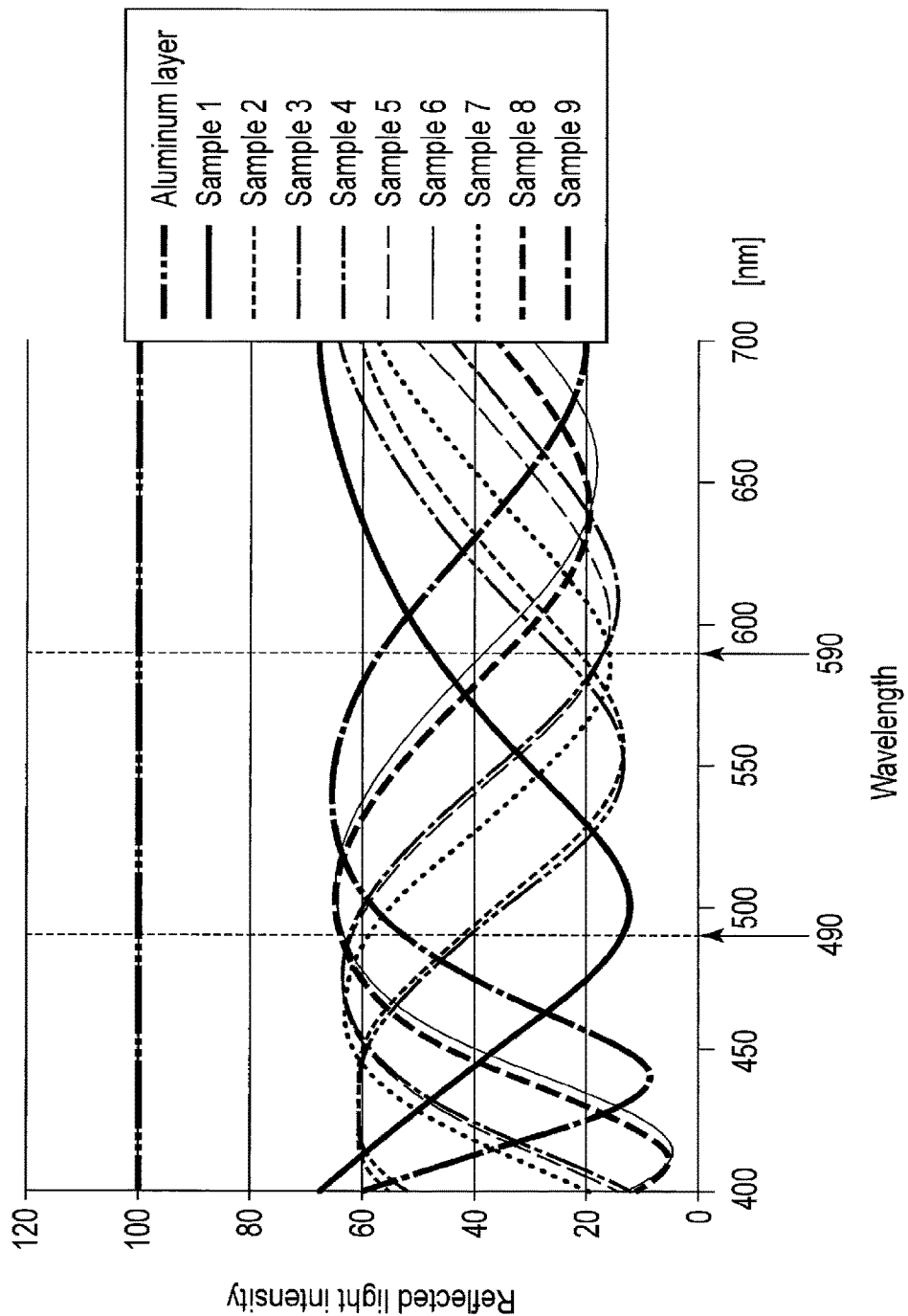
F I G. 11

LIQUID CRYSTAL DISPLAY DEVICE

CROSS-REFERENCE TO RELATED APPLICATIONS

This application is based upon and claims the benefit of priority from Japanese Patent Application No. 2015-247467, filed Dec. 18, 2015, the entire contents of which are incorporated herein by reference.

FIELD

Embodiments described herein relate generally to a liquid crystal display device.

BACKGROUND

In general, for example, a liquid crystal display device is known as a display device. In addition, a mobile application has been rapidly widespread. A smartphone or the like using a liquid crystal display device is known as the mobile application. In the liquid crystal display device, improvement in display performance represented by higher definition, color purity enhancement, brightness enhancement and the like is required. In the liquid crystal display device, lower power consumption to achieve a long-time operation using a battery is also required.

Typical examples of the liquid crystal display device are a light-transmissive liquid crystal display device which comprises a light source, and a light-reflective liquid crystal display device which does not comprise a light source but displays an image by using external light. The light-reflective liquid crystal display device can contribute more to low power consumption than the light-transmissive liquid crystal display device.

BRIEF DESCRIPTION OF THE DRAWINGS

FIG. 2 is a cross-sectional view showing a liquid crystal display panel and an optical element shown in FIG. 1.

FIG. 3 is a plan view showing a configuration of a first substrate shown in FIG. 1 and FIG. 2.

FIG. 4 is an illustration of an equivalent circuit indicating a unit pixel shown in FIG. 3.

FIG. 5 is a plan view showing a configuration of the liquid crystal display panel, illustrating pixel electrodes in four unit pixels and a stacked layer body.

FIG. 8 is a partially enlarged cross-sectional view showing a light-reflecting layer and a fifth insulating film shown in FIG. 7, for explanation of a light interference effect of the light-reflecting layer, the transparent conductive layer and the fifth insulating film.

FIG. 9 is a graph showing transmitted light spectra of respective first and second color layers of the color filter.

FIG. 10 is a table showing a thickness of the transparent conductive layer and a thickness of the fifth insulating film of each of samples 1 to 9 of a stacked layer structure including the light-reflecting layer, the transparent conductive layer and the fifth insulating film.

FIG. 11 is a graph showing the reflected light spectra of samples 1 to 9.

DETAILED DESCRIPTION

Figure 1:
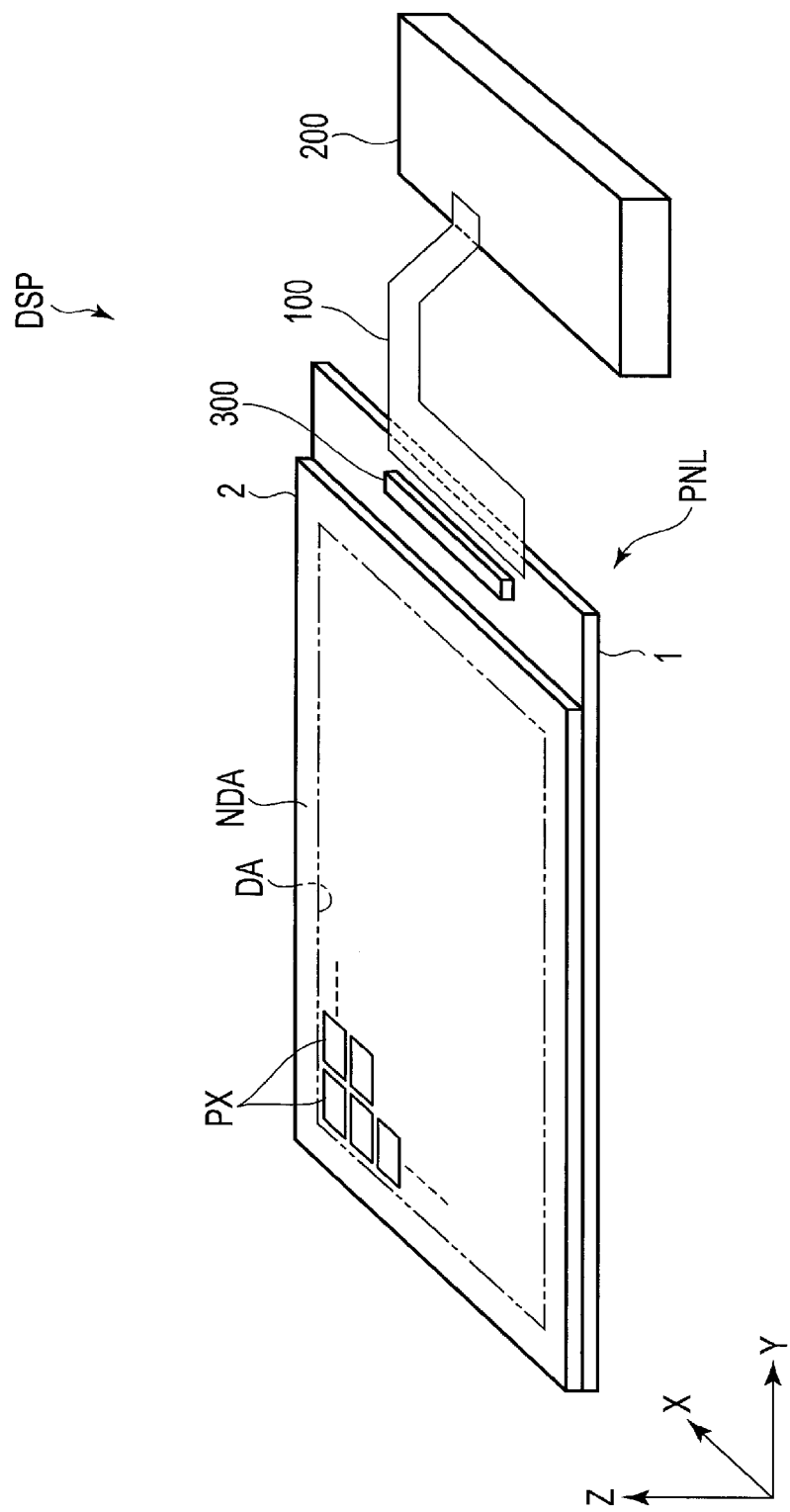
FIG. 1 is a perspective view showing a liquid crystal display device of one of the embodiments.

In general, according to one embodiment, there is provided a liquid crystal display device comprising: a first substrate; a second substrate including a color filter opposed to the first substrate; and a liquid crystal layer held between the first substrate and the second substrate, the first substrate including: a light-reflecting layer; a transparent conductive layer disposed on the light-reflecting layer; an insulating layer disposed on the transparent conductive layer; a first pixel electrode disposed on a side of the liquid crystal layer in view of the light-reflecting layer; and a second pixel electrode disposed on the side of the liquid crystal layer in view of the light-reflecting layer, and being adjacent to the first pixel electrode and spaced apart from the first pixel electrode with a gap, the color filter including: a first color layer having a transmitted light spectrum indicating a light transmittance peak within a first wavelength range; and a second color layer having a transmitted light spectrum indicating a light transmittance peak within a second wavelength range which is on a side of a long wavelength in view of the first wavelength range, the gap, the first color layer or the second color layer, the light-reflecting layer, the transparent conductive layer and the insulating layer being overlaid.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape, etc. of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

In the display device, employment of means for disposing a black matrix on the counter-substrate side or forming the black matrix to be thicker and hiding an area where liquid crystal molecules cause an alignment failure is considered to suppress degradation in quality of a display image.

In this case, however, a light-shielding area may be extended due to the black matrix and a quantity of received outside light may be reduced remarkably by the black matrix. For this reason, the brightness level of the display image may be reduced remarkably. In contrast, light leakage occurs between pixels, in the display device which does not comprise the black matrix.

Thus, a liquid crystal display device excellent in display quality can be obtained by solving the above-explained problems in the embodiments. For example, a liquid crystal display device capable of suppressing the reduction in light reflectance while suppressing the degradation in contrast characteristics can be obtained. Next, means and methods for solving the problems will be explained.

FIG. 1 is a perspective view showing a liquid crystal display device of one of the embodiments. A first direction X, a second direction Y and a third direction Z are further illustrated. The second direction Y is orthogonal to the first direction X. The third direction Z is orthogonal to the first direction X and the second direction Y.

As shown in FIG. 1, a liquid crystal display device DSP is a light-reflective liquid crystal display device capable of displaying an image by selectively reflecting external light. The liquid crystal display device DSP comprises a liquid crystal display panel PNL, a connection module 100, and a controller 200. The liquid crystal display panel PNL includes a display area DA at the center as an area for displaying an image (video) and a non-display area NDA around the display area DA. The connection module 100 is connected to the non-display area NDA of the liquid crystal display panel PNL. A flexible printed circuit (FPC) or a tape carrier package (TCP) can be used as the connection module 100. The controller 200 is connected with the liquid crystal display panel PNL via the connection module 100. The controller 200 controls an image signal (for example, a video signal) output to the liquid crystal display panel PNL.

The liquid crystal display panel PNL includes a first substrate 1 in a rectangular shape, a second substrate 2 in a rectangular shape and a driving module 300. In the present embodiment, the first substrate 1 may be restated as an array substrate and the second substrate 2 may be restated as a counter-substrate. For example, short sides of the first substrate 1 and the second substrate 2 extend in the first direction X. Long sides of the first substrate 1 and the second substrate 2 extend in the second direction Y. The long side of the first substrate 1 is longer than the long side of the second substrate 2. For this reason, the first substrate 1 includes a region which is not opposed to the second substrate 2. The driving module 300 is mounted in this region. The first substrate 1 is opposed to the second substrate 2 in the third direction Z.

The liquid crystal display panel PNL includes pixels PX arrayed in the first direction X and the second direction Y, in the display area DA. Each of the pixels PX varies the light reflectance in accordance with the image signal (video signal) supplied from the controller 200. The liquid crystal display panel PNL thereby displays the image (video) in the display area DA.

In the following descriptions, a direction from the first substrate 1 to the second substrate 2 is called an upward direction and a direction from the second substrate 2 to the first substrate 1 is called a downward direction. For this reason, the third direction Z may be an upward direction. In addition, "a second member located above a first member" and "a second member located below a first member" indicate that the second member may be in contact with the first member or may be located remote from the first member. In the latter case, a third member may be interposed between the first member and the second member. In contrast, "a second member on a first member" and "a second member under a first member" indicate that the second member is in contact with the first member.

FIG. 2 is a cross-sectional view showing the liquid crystal display panel PNL and an optical element 10 shown in FIG. 1.

As shown in FIG. 2, the liquid crystal display panel PNL includes a liquid crystal layer 3. The first substrate 1 includes, for example, a glass substrate 4a as a transparent insulating substrate. The second substrate 2 includes, for example, a glass substrate 4b as a transparent insulating substrate. A gap between the first substrate 1 and the second substrate 2 is held by spacers 5. The first substrate 1 and the second substrate 2 are bonded to each other by a sealing member 6 disposed in the non-display area NDA. The liquid crystal layer 3 is formed in a space surrounded by the first substrate 1, the second substrate 2 and the sealing member 6.

The optical element 10 is located outside the liquid crystal display panel PNL and bonded to the glass substrate 4b. The optical element 10 is opposed to at least an entire body of the display area DA. The optical element 10 includes at least a polarizer.

FIG. 3 is a plan view showing a configuration of the first substrate 1 shown in FIG. 1 and FIG. 2.

As shown in FIG. 3, unit pixels UPX are arrayed in a matrix on the glass substrate 4a, in the display area DA. Then, m unit pixels UPX are arranged in the first direction X, and n unit pixels UPX are arranged in the second direction Y.

Each of the unit pixels UPX comprises pixels PX. In this example, each unit pixel UPX comprises first to fourth pixels PXa to PXd. The second pixel PXb is located adjacent to the first pixel PXa in the second direction Y. The third pixel PXc is located adjacent to the first pixel PXa in the first direction X. The fourth pixel PXd is located adjacent to the second pixel PXb in the first direction X and adjacent to the third pixel PXc in the second direction Y.

When attention is focused on not the unit of the unit pixels UPX, but the unit of the pixels PX, 2×m pixels PX are arranged in the first direction X and 2×n pixels PX are arranged in the second direction Y. In odd-numbered rows, the first pixels PXa and the third pixels PXc are alternately aligned in order. In even-numbered rows, the second pixels PXb and the fourth pixels PXd are alternately aligned in order. In odd-numbered columns, the first pixels PXa and the second pixels PXb are alternately aligned in order. In even-numbered columns, the third pixels PXc and the fourth pixels PXd are alternately aligned in order.

The unit pixels UPX may be restated as picture elements. Alternatively, the unit pixels UPX may be restated as pixels and, in this case, the pixels PX may be restated as sub-pixels.

A driving circuit 9 and an outer lead bonding pad group (hereinafter referred to as an OLB pad group) pG are formed above the glass substrate 4a, outside the display area DA. In the present embodiment, the driving circuit 9 is used as a scanning line drive circuit.

In the display area DA, plural (2×n) scanning lines 15 and plural (2×m) signal lines 17 are disposed above the glass substrate 4a. The signal lines 17 are connected to the driving module 300. The signal lines 17 extend in the second direction Y and are arranged in the first direction X so as to be spaced apart from each other. The signal lines 17 are electrically connected to the aligned pixels PX, respectively. The scanning lines 15 are connected to the drive circuit 9. The scanning lines 15 extend in the first direction X and are arranged in the second direction Y so as to be spaced apart from each other. Each of the scanning lines 15 is electrically connected to the pixels PX of single row.

Next, one of the unit pixels UPX will be extracted and described. FIG. 4 is an illustration of an equivalent circuit indicating the unit pixel UPX shown in FIG. 3.

As shown in FIG. 4, the first to fourth pixels PXa to PXd are the pixels configured to display images of different colors. In the present embodiment, the first to fourth pixels PXa to PXd are the pixels configured to display images of a green color (G), a blue color (B), a red color (R) and a white color (W). The unit pixel UPX is composed of what is called RGBW square pixels, i.e., four-color square pixels arrayed in square.

The first pixel PXa is a pixel of a green color (G) and comprises a first pixel electrode 23a and a first switching element 12a. In the present embodiment, the first switching element 12a is composed of a thin-film transistor (TFT). The first switching element 12a is electrically connected to the scanning line 15, the signal line 17 and the first pixel electrode 23a. The configuration is the same as that of each of the second to fourth switching elements 12b to 12d as explained below.

The second pixel PXb is a pixel of a blue color (B) and comprises a second pixel electrode 23b and a second switching element 12b. The second pixel PXb is connected to the same signal line 17 as the signal line to which the first pixel PXa is connected.

The third pixel PXc is a pixel of a red color (R) and comprises a third pixel electrode 23c and a third switching element 12c. The third pixel PXc is connected to the same scanning line 15 as the scanning line to which the first pixel PXa is connected.

The fourth pixel PXd is a pixel of a white color (W) and comprises a fourth pixel electrode 23d and a fourth switching element 12d. The fourth pixel PXd is connected to the same scanning line 15 as the scanning line to which the second pixel PXb is connected and the same signal line 17 as the signal line to which the third pixel PXc is connected.

FIG. 5 is a plan view showing a configuration of the liquid crystal display panel PNL, illustrating the pixel electrodes PE in four unit pixels UPX and a stacked layer body 20.

As shown in FIG. 5, the first substrate 1 further includes the stacked layer body 20. The stacked layer body 20 is disposed in first areas A1 opposed to gaps formed among the pixel electrodes 23. The stacked layer body 20 is shaped to correspond to the gaps among the pixel electrodes 23. In the present embodiment, the stacked layer body 20 is disposed in the first areas A1 and second areas A2 opposed to the pixel electrodes 23. The stacked layer body 20 is formed in a grating shape. Alternatively, the stacked layer body 20 is formed of a single layer including openings 20a. The openings 20a are used to connect the corresponding pixel electrodes 23 to the corresponding switching elements 12, respectively.

For this reason, the pixel electrodes 23 are adjacent and spaced apart by the gaps in the region opposed to the stacked layer body 20.

The stacked layer body 20 is formed by stacking a light-reflecting layer RE and a transparent conductive layer TR. The light-reflecting layer RE and the transparent conductive layer TR are overlaid in the gaps among the pixel electrodes 23, in view of the X-Y plane. In the present embodiment, the light-reflecting layer RE and the transparent conductive layer TR have the same size and the same shape and are completely overlaid, in view of the X-Y plane. The light-reflecting layer RE has at least an optical reflectivity and may further have an electric conductivity. In the present embodiment, the light-reflecting layer RE is formed of a metal such as molybdenum tungsten (MoW). For this reason, the light-reflecting layer RE of the present embodiment has both the optical reflectivity and the electric conductivity. In addition, the light-reflecting layer RE is maintained at a constant potential but is not limited to this, and may be in, for example, an electrically floating state. The transparent conductive layer TR is formed of a transparent, electrically conductive material such as indium tin oxide (ITO) and indium zinc oxide (IZO). In the present embodiment, the transparent conductive layer TR is formed of ITO. When the light-reflecting layer RE has the electric conductivity, the transparent conductive layer TR has the same potential as the light-reflecting layer RE.

In view of the X-Y plane, the stacked layer body 20 may be disposed in at least the first areas A1 alone and may not be disposed in the second areas A2. However, the stacked layer body 20 may extend not only to the first areas A1, but to the second areas A2. Light leakage from the gaps in the pixel electrodes 23 to the switching element 12 side can be thereby further suppressed. Furthermore, when the stacked layer body 20 is formed to extend to the second area A2, an area in which the stacked layer body 20 and the pixel electrodes 23 are opposed is desirably large in view of forming a storage capacitor. For example, a capacitance value of the storage capacitor formed by the pixel electrodes 23 and the stacked layer body 20 can be made large by causing the pixel electrodes 23 to be opposed to the stacked layer body 20 in the entire second areas A2 excluding the openings 20a and maintaining the stacked layer body 20 having the electric conductivity at a constant potential as described in the present embodiment.

The stacked layer body 20 is formed of a single layer in view of the X-Y plane but is not limited to this. For example, the stacked layer body 20 may include stacked layer portions spaced apart by gaps in view of the X-Y plane. For example, the stacked layer body 20 may be partitioned into plural parts. In this case, each of the stacked layer portions may be maintained at a constant potential and may be in an electrically floating state.

Figure 6:
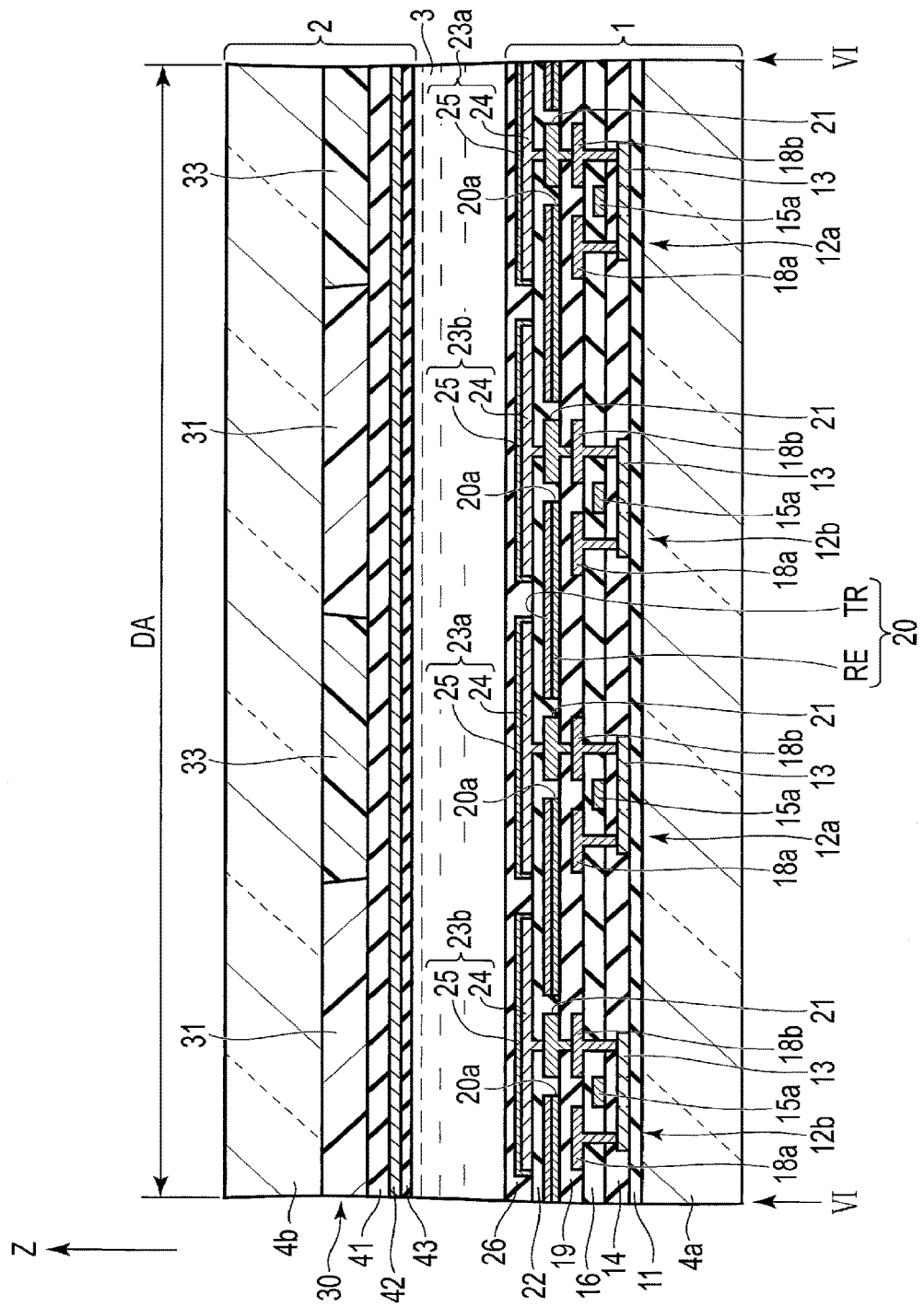
FIG. 6 is a cross-sectional view showing the liquid crystal display panel shown in FIG. 5 as seen along line VI-VI.

FIG. 6 is a cross-sectional view showing the liquid crystal display panel PNL shown in FIG. 5 as seen along line VI-VI.

As shown in FIG. 6, a first insulating film 11 is formed on a glass substrate 4a. The switching elements 12 (12a to 12d) are formed above the first insulating film 11. More specifically, semiconductor layers 13 are formed on the first insulating film 11. A second insulating film 14 is formed on the first insulating film 11 and the semiconductor layers 13. The scanning lines 15 are formed on the second insulating film 14. The scanning lines 15 include first electrodes (gate electrodes) 15a opposed to first regions (channel regions) of the semiconductor layers 13. A third insulating film 16 is formed on the second insulating film 14 and the scanning lines 15 (first electrodes 15a).

The signal lines 17, second electrodes 18a and third electrodes 18b are formed on the third insulating film 16. The signal lines 17, the second electrodes 18a and the third electrodes 18b are formed of the same material and formed simultaneously. The signal lines 17 are formed integrally with the second electrodes 18a. The second electrodes 18a are in contact with second regions of the semiconductor layers 13 through contact holes formed in the second insulating film 14 and the third insulating film 16. The third electrodes 18b are in contact with third regions of the semiconductor layers 13 through the other contact holes formed in the second insulating film 14 and the third insulating film 16. The second regions or the third regions function as source regions, and the others function as drain regions. The switching element 12 is formed as described above.

A fourth insulating film 19 is formed on the third insulating film 16, the signal lines 17, the second electrodes 18a and the third electrodes 18b. The stacked layer body 20 and connection portions 21 are formed on the fourth insulating film 19. In the stacked layer body 20, the light-reflecting layer RE is located on the lower layer side, and the transparent conductive layer TR is located on the upper layer side. In other words, a bottom surface of the light-reflecting layer RE is in contact with the fourth insulating film 19, and an upper surface of the transparent conductive layer TR is in contact with a fifth insulating film 22. The connection portions 21 are located inside the openings 20a of the stacked layer body 20, disposed to be spaced apart on the stacked layer body 20, and electrically insulated from the stacked layer body 20. The connection portions 21 are in contact with the third electrodes 18b through contact holes formed in the fourth insulating film 19. The stacked layer body 20 and the connection portions 21 can be formed of the same material and formed simultaneously. In the present embodiment, each of the stacked layer body 20 and the connection portions 21 is formed by stacking a lower layer of MoW and an upper layer of ITO.

The fifth insulating film 22 is formed on the fourth insulating film 19, the stacked layer body 20 and the connection portions 21. The fifth insulating film 22 is in contact with the stacked layer body 20 and the like. The fifth insulating film 22 is disposed between a group of the stacked layer body 20 and the connection portions 21 and a pixel electrode group including the first pixel electrodes 23a and the second pixel electrodes 23b. The fifth insulating film 22 is formed of an insulating layer or two or more stacked insulating layers. In the present embodiment, the fifth insulating film 22 is formed of an insulating layer of silicon nitride (SiN).

The pixel electrodes 23 such as the first pixel electrodes 23a and the second pixel electrodes 23b are formed on the fifth insulating film 22. The pixel electrodes 23 are in contact with the corresponding connection portions 21 through contact holes formed in the fifth insulating film 22. For example, the first pixel electrodes 23a are electrically connected to the semiconductor layers 13 (first semiconductor layers) of the first switching elements 12a, and the second pixel electrodes 23b are electrically connected to the semiconductor layers 13 (second semiconductor layers) of the second switching elements 12b.

The pixel electrodes 23 are formed of the light-reflecting conductive layers 24. Alternatively, the pixel electrodes 23 are formed of the stacked layer bodies which are formed of the light-reflecting conductive layers 24 and the transparent conductive layers 25. The light-reflecting conductive layers 24 can be formed of a metal material such as aluminum (Al) and an Al alloy. The transparent conductive layers 25 can be formed of a transparent conductive material such as ITO and IZO.

In the present embodiment, the pixel electrodes 23 are light-reflective pixel electrodes formed of the stacked layer bodies which are formed of the light-reflecting conductive layers 24 and the transparent conductive layers 25. The liquid crystal display panel PNL is a light-reflective liquid crystal display panel. The pixel electrodes 23 have the optical reflectivity and can reflect light incident from the side of the liquid crystal layer 3 (display surface) to the side of the liquid crystal layer 3.

For example, the transparent conductive layers 25 are located at uppermost layers of the pixel electrodes 23. In the present embodiment, the size of the transparent conductive layers 25 is larger than the size of the light-reflecting conductive layers 24, and the transparent conductive layers 25 completely cover upper surfaces and side surfaces of the light-reflecting conductive layers 24. However, the sizes of the light-reflecting conductive layers 24 and the transparent conductive layers 25 are not limited to those in the present embodiment and can be variously changed. For example, the size of the transparent conductive layers 25 may be the same as the size of the light-reflecting conductive layers 24, or the transparent conductive layers 25 may be formed to be completely overlaid on the light-reflecting conductive layers 24.

An alignment film 26 is formed on the fifth insulating film 22 and the pixel electrodes 23. The alignment film 26 is in contact with the liquid crystal layer 3. In the present embodiment, the alignment film 26 is a horizontal alignment film and has an alignment treatment orientation. The alignment film 26 can thereby set the liquid crystal molecules of the liquid crystal layer 3 to be subjected to initial alignment.

The first substrate 1 is formed as described above.

In contrast, the second substrate 2 includes a color filter 30, an overcoat film 41, a counter-electrode (common electrode) 42 and an alignment film 43 in addition to a glass substrate 4b.

The color filter 30 is formed below a surface of the glass substrate 4b which is opposed to the first substrate 1. The color filter 30 is formed under the glass substrate 4b. The color filter 30 includes layers of plural colors located in the display area DA. In the present embodiment, the color filter 30 includes not only a first color layer 31 and a third color layer 33, but also a second color layer 32 and a fourth color layer 34 as explained below.

The first color layer 31 is a blue layer of a blue-colored resin material and forms the second pixel PXb. The second color layer 32 is a red layer of a red-colored resin material and forms the third pixel PXc. The third color layer 33 is a green layer of a green-colored resin material and forms the first pixel PXa. The fourth color layer 34 is a white layer or a substantially transparent layer, and forms the fourth pixel PXd. The expression "substantially transparent" implies a pale color of any one of visible light colors in addition to an achromatic color. The color filter 30 may be formed without the fourth color layer 34. Side surfaces of adjacent layers of the color layers are in contact with each other.

The second substrate 2 of the present embodiment is formed without a light-shielding layer called black matrix. The light-shielding layer is located in the display area DA and extends along the boundary of the color layers. For this reason, reduction in the aperture ratio of the pixels PX can be suppressed in the present embodiment.

The overcoat film 41 is formed under the color filter 30 to cover the color filter 30. The overcoat film 41 is formed of a transparent insulating material, for example, a transparent acrylic resin material. The overcoat film 41 has a function of reducing unevenness of the surface on the side of the second substrate 2 which is opposed to the first substrate 1. The overcoat film 41 may be disposed as needed.

The counter-electrode 42 and the alignment film 43 are disposed in order under the overcoat film 41. The counter-electrode 42 is formed of a transparent conductive material such as ITO and IZO. The alignment film 43 is in contact with the liquid crystal layer 3. The alignment film 43 is a horizontal alignment film and has an alignment treatment orientation. The alignment film 43 can thereby set the liquid crystal molecules of the liquid crystal layer 3 to be subjected to initial alignment.

The second substrate 2 is formed as described above.

The liquid crystal layer 3 is held between the first substrate 1 and the second substrate 2. In the present embodiment, the liquid crystal layer 3 is formed of a positive liquid crystal material. The liquid crystal display panel PNL adopts the TN mode.

Next, the configuration of the color filter 30 will be described.

Figure 7:
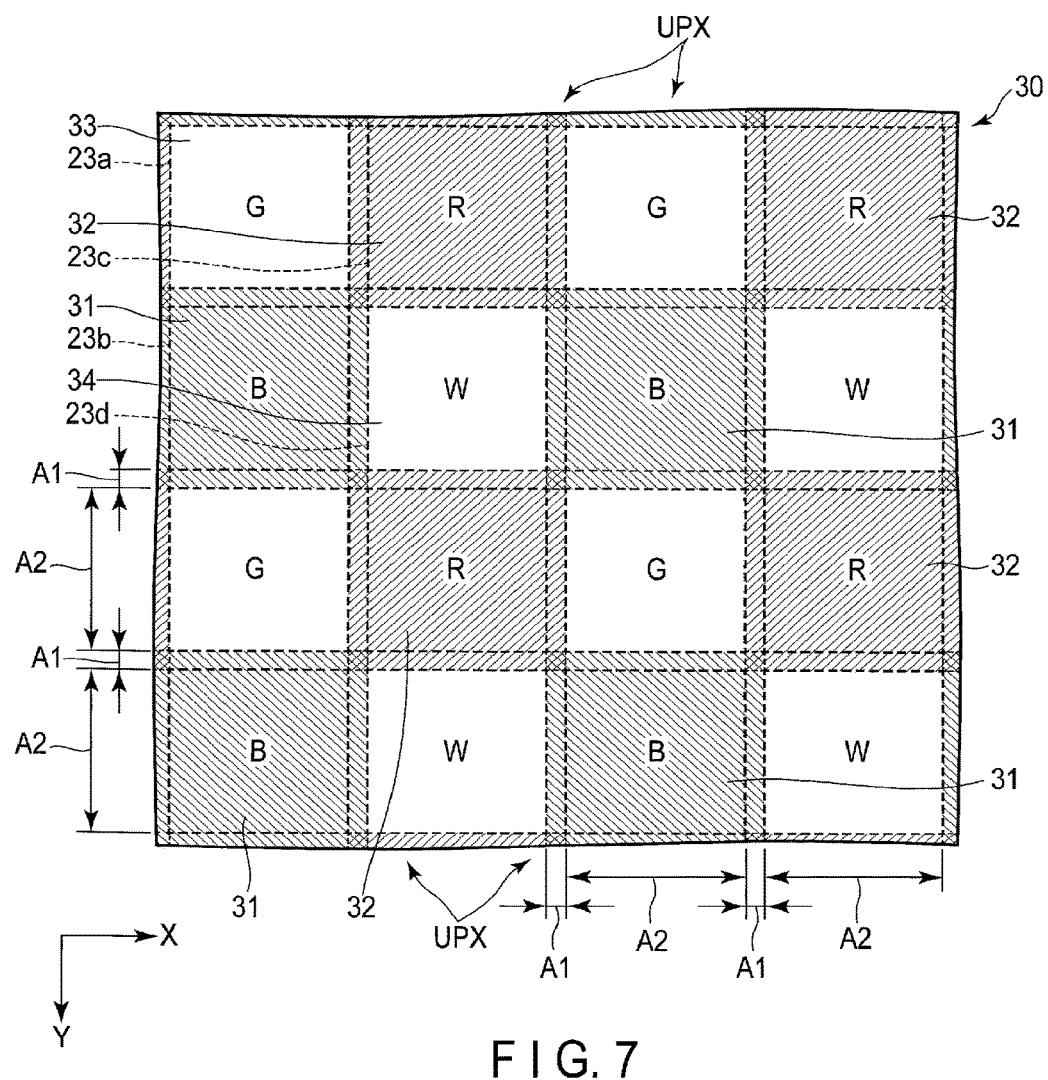
FIG. 7 is another plan view showing the configuration of the liquid crystal display panel, illustrating pixel electrodes in four unit pixels and a color filter.

FIG. 7 is another plan view showing the configuration of the liquid crystal display panel PNL, illustrating the pixel electrodes 23 in four unit pixels UPX and the color filter 30. In FIG. 7, hatch lines are drawn in the first color layers 31 and the second color layers 32.

As shown in FIG. 7, the third color layers 33 and the second color layers 32 are alternately arranged in order in odd-numbered rows. The first color layers 31 and the fourth color layers 34 are alternately arranged in order in even-numbered rows. The third color layers 33 and the first color layers 31 are alternately arranged in order in the odd-numbered columns. The second color layers 32 and the fourth color layers 34 are alternately arranged in order in the even-numbered columns.

The third color layers 33 are formed in the second areas A2 opposed to the first pixel electrodes 23a. The third color layers 33 are opposed to the entire regions of the first pixel electrodes 23a (transparent conductive layer 25).

The fourth color layers 34 are formed in the second areas A2 opposed to the fourth pixel electrodes 23d. The fourth color layers 34 are opposed to the entire regions of the fourth pixel electrodes 23d (transparent conductive layer 25).

The second color layers 32 are formed in the second areas A2 opposed to the third pixel electrodes 23c and further formed to extend to the first areas A1 surrounding the second areas A2. Side edges of the second color layers 32 are in contact with side edges of the adjacent third color layers 33 and side edges of the adjacent fourth color layers 34.

The first color layers 31 are formed in the second areas A2 opposed to the second pixel electrodes 23b and further formed to extend to the first areas A1 surrounding the second areas A2. Side edges of the first color layers 31 are in contact with side edges of the adjacent third color layers 33 and side edges of the adjacent fourth color layers 34. The first color layers 31 may be partially overlaid on the second color layers 32 in the first areas A1.

As understood from the above, the color layers existing in the first areas A1, of the color filter 30, are the first color layers 31 and the second color layers 32 alone. In other words, several color layers are disposed such that the first color layers 31 and the second color layers 32 alone exist in the first areas A1.

For example, areas between the first pixel electrodes 23a and the second pixel electrodes 23b, of the first areas A1, are opposed to the first color layers 31 or the second color layers 32, and these color layers are opposed to the first pixel electrodes 23a or the second pixel electrodes 23b. In the present embodiment, the first color layers 31 are opposed to the areas between the first pixel electrodes 23a and the second pixel electrodes 23b, and also opposed to the second pixel electrodes 23b.

Each of luminosity of the first color layers 31 and luminosity of the second color layers 32 are lower than each of luminosity of the third color layers 33 and luminosity of the fourth color layers 34. For this reason, the present embodiment can make the user hardly feel the light leaking from the first areas A1 as compared with a case where the third color layers 33 and the fourth color layers 34 are disposed in the first areas A1. Thus, situations of causing the user to undesirably feel the images bright can be reduced.

Next, an interference effect of the reflected light will be described.

FIG. 8 is a partially enlarged cross-sectional view showing the light-reflecting layer RE, the transparent conductive layer TR and the fifth insulating film 22 shown in FIG. 7, for explanation of the light interference effect of the light-reflecting layer RE, the transparent conductive layer TR and the fifth insulating film 22.

As shown in FIG. 8, the first substrate 1 has a stacked layer structure of the light-reflecting layer RE, the transparent conductive layer TR and the fifth insulating film 22 in the first area A1. The light-reflecting layer RE, the transparent conductive layer TR and the fifth insulating film 22 reflect adjusted light obtained by adjusting the light incident from the liquid crystal layer 3 side to the liquid crystal layer 3 side. The adjusted light has a reflected light spectrum which indicates a light reflectance peak within the adjusted wavelength range between the first wavelength range and the second wavelength range.

A reflected light interference phenomenon occurs due to a situation in which first reflected light L1 reflected on the surface of the fifth insulating film 22, second reflected light L2 entering the fifth insulating film 22, reflected on the surface of the transparent conductive layer TR and emitted from the surface of the fifth insulating film 22, and third reflected light L3 entering the fifth insulating film 22 and the transparent conductive layer TR, reflected on the surface of the light-reflecting layer RE and emitted from the surface of the fifth insulating film 22 interfere with each other. For this reason, the property of the reflected light spectrum that the reflected light intensity becomes higher as phases of the first reflected light L1, the second reflected light L2 and the third reflected light L3 are coincident, and the reflected light intensity becomes lower as the phases are shifted, is used. The light reflectance peak of the adjusted light can be thereby shifted to a range between the first wavelength range and the second wavelength range.

The transparent conductive layer TR has a thickness T1. The fifth insulating film 22 has a thickness T2.

Each of the first color layers 31 and the second color layers 32 absorb more adjusted light having the reflected light spectrum than each of the third color layers 33 and the fourth color layers 34. The amount of the light leaking from the first areas A1 can be reduced by urging the adjusted light to pass through the first color layers 31 or the second color layers 32.

Next, spectral characteristics of the color filter 30 will be described.

FIG. 9 is a graph showing transmitted light spectrum of the first color layer 31 and the second color layer 32 of the color filter 30. It should be noted that examples of the transmitted light spectrum are illustrated in FIG. 9. The transmitted light spectrum of the respective color layers are not limited to the examples illustrated in FIG. 9, but can be varied.

As shown in FIG. 9, the first color layer 31 and the second color layer 32 allow light of specific wavelength ranges of the visible light to pass and block light of different, specific wavelength ranges. In the present specification, for example, light having a wavelength range from 380 to 780 nm is defined as "visible light".

The first color layer 31 has a transmitted light spectrum S1 indicating the light transmittance peak within the first wavelength range. In the embodiment, the first wavelength range is higher than or equal to 380 nm and lower than 490 nm.

The second color layer 32 has a transmitted light spectrum S2 indicating the light transmittance peak within the second wavelength range which is on the side of the longer wavelength than the first wavelength range. In the embodiment, the second wavelength range is higher than or equal to 590 nm and lower than or equal to 780 nm.

In the embodiment, the adjusted wavelength range is higher than or equal to 490 nm and lower than 590 nm. These values are within a range different from the light transmittance peak of the transmitted light spectrum S1 or the light transmittance peak of the transmitted light spectrum S2. The adjusted light is made weak in the range coincident with the light transmittance peak of the transmitted light spectra S1 and S2 and is made strong in the range remote from the light transmittance peak of the transmitted light spectra S1 and S2, by fixing the adjusted wavelength range to these values. The intensity of the adjusted light is therefore remarkably restricted by the first color layer 31 or the second color layer 32.

The transmitted light spectrum of each of the color layers may have light transmittance peaks. If the light transmittance peaks are classified into a sub-peak and a main peak higher in transmitted light intensity than the sub-peak, the main peak may be within the wavelength range.

The stacked layer structure composed of the light-reflecting layer RE, the transparent conductive layer TR and the fifth insulating film 22 is designed to form the adjusted light having the above-described reflected light spectrum. Thus, for example, the thickness T1 of the transparent conductive layer TR and the thickness T2 of the fifth insulating film 22 are adjusted. Each of the thickness T1 and the thickness T2 is not specified but may be any value. The thickness T2 of the fifth insulating film 22 is desirably in a range from 170 to 190 [nm] to set the storage capacitance generated between the stacked layer body 20 and the pixel electrode 23 to be appropriate. Even if the thickness T2 of the fifth insulating film 22 is fixed, the wavelength range can be set to a range of desired values such as a range higher than or equal to 490 nm and lower than 590 nm, by adjusting the thickness T1 of the transparent conductive layer TR. In the present embodiment, if the transparent conductive layer is formed of ITO, the adjusted wavelength range can be set to a range higher than or equal to 490 nm and lower than 590 nm, by adjusting the thickness to a range from 40 to 60 [nm].

In addition, the means for forming the adjusted light is not limited to the stacked layer structure composed of the light-reflecting layer RE, the transparent conductive layer TR and the fifth insulating film 22, but can be variously modified. For example, the fifth insulating film 22 may be formed of an insulating layer of a material other than SiN. Alternatively, the fifth insulating film 22 may be formed of two or more stacked insulating layers. Alternatively, the other insulating film interposed between the light-reflecting layer RE and the transparent conductive layer TR and having the interference effect may be added to the stacked layer structure.

The present inventors searched the reflected light spectral characteristics by using several samples of the stacked layer structure including the light-reflecting layer, the transparent conductive layer and the fifth insulating film. FIG. 10 is a table showing the thickness T1 of the transparent conductive layer TR and the thickness T2 of the fifth insulating film 22 of each of samples 1 to 9 of the stacked layer structure including the light-reflecting layer RE, the transparent conductive layer TR and the fifth insulating film 22.

As shown in FIG. 10, the samples used here are nine samples, i.e., samples 1 to 9. The thickness T1 of the transparent conductive layer TR is 20 nm in each of samples 1 to 3, 40 nm in each of samples 4 to 6, and 60 nm in each of samples 7 to 9. The thickness T2 of the fifth insulating film 22 is 150 nm in each of samples 1, 4 and 7, 170 nm in each of samples 2, 5 and 8, and 190 nm in each of samples 3, 6 and 9.

In each of samples 1 to 9, the light-reflecting layer RE is formed of MoW, the transparent conductive layer TR is formed of ITO, and the fifth insulating film 22 is formed of SiN. In each of samples 1 to 9, the refractive index of the transparent conductive layer TR is the same and is selected from a range higher than or equal to 1.7 and lower than or equal to 1.9. In addition, in each of samples 1 to 9, the refractive index of the fifth insulating film 22 is the same and is selected from a range higher than or equal to 1.8 and lower than or equal to 1.9.

FIG. 11 is a graph showing the reflected light spectrum of samples 1 to 9. FIG. 11 shows not only the spectra of the reflected light (adjusted light) emitted from the samples 1 to 9, but also an intensity of the light reflected on an aluminum layer. The aluminum layer is a single layer formed of aluminum. The samples 1 to 9 and the aluminum layer were irradiated with light under the same conditions and the reflected light intensities were measured. The reflected light intensities were standardized by setting the intensity of the light reflected on the aluminum layer to 100 and the intensities of the reflected light of the samples 1 to 9 were calculated.

As understood from FIG. 11, the intensities of the reflected light in the case of using the samples 1 to 9 were smaller than the intensity of the reflected light in the case of using the aluminum layer, in a wavelength range from at least 400 to 700 nm. In addition, the reflected light of each of the samples 6, 8 and 9, of the samples 1 to 9, was understood to have the reflected light spectrum indicating the light reflectance peak within the adjusted wavelength range (higher than or equal to 490 nm and lower than 590 nm). For this reason, the liquid crystal display device DSP desirably employs the stacked layer structure of the samples 6, 8 and 9, of the samples 1 to 9.

According to the liquid crystal display device DSP of the embodiment having the above-described configuration, the liquid crystal display device DSP comprises the first substrate 1, the second substrate 2 including the color filter 30, and the liquid crystal layer 3. The color filter 30 includes at least the first color layer 31 having the transmitted light spectrum S1 indicating the light transmittance peak within the first wavelength range, and the second color layer 32 having the transmitted light spectrum S2 indicating the light transmittance peak within the second wavelength range.

The second substrate 2 does not include a light-shielding layer in the display area DA. Since the reduction in the aperture ratio of the pixels PX can be suppressed, the reduction in the light reflectance can be suppressed and the reduction in the brightness level of the display image can also be suppressed.

The pixel electrodes 23 are arranged adjacent and spaced apart in the region opposed to the light-reflecting layer RE. Since the light-reflecting layer RE can suppress the light leakage from the gaps of the pixel electrodes 23 to the switching element 12 (semiconductor layer 13) side, the light-reflecting layer RE can suppress the occurrence of the leak current in the semiconductor layer 13.

The first substrate 1 further includes the transparent conductive layer TR and the fifth insulating film 22 (insulating layer) disposed between the light-reflecting layer RE and the pixel electrode group including the first pixel electrodes 23a and the second pixel electrodes 23b. The gap of the pixel electrodes 23, the first color layer 31 or the second color layer 32, the light-reflecting layer RE, the transparent conductive layer TR, and the fifth insulating film 22 are overlaid in planar view. The light-reflecting layer RE, the transparent conductive layer TR and the fifth insulating film 22 reflect adjusted light obtained by adjusting the light incident from the liquid crystal layer 3 side to the liquid crystal layer 3 side. The adjusted light is capable of having a reflected light spectrum which indicates a light reflectance peak within the adjusted wavelength range between the first wavelength range and the second wavelength range. Since the adjusted light is absorbed by the first color layers 31 and the second color layers 32 disposed in the first areas A1, the amount of the light leaking from the first areas A1 can be reduced.

For example, even if the light leakage occurs in the first areas A1 due to the alignment failure of the liquid crystal molecules such as edge reverse, the amount of light in the first areas A1 can be reduced. For this reason, the degradation in contrast characteristics can be suppressed while suppressing the reduction in the light reflectance.

Thus, the liquid crystal display device DSP having excellent display quality can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the shape of the pixel electrodes 23 (23a, 23b, 23c, and 23d) is not limited to a square, but can be variously modified and may be a rectangular shape. The shape of the pixel electrodes 23 may be a shape other than a rectangular shape. In these cases, too, the same advantages as those of the above-described embodiments can be obtained.

The unit pixel UPX is not limited to the RGBW square pixel, but can be variously modified. For example, the unit pixel UPX may be composed of what is called an RGBW vertical stripe pixel in which four rectangular pixels (pixel electrodes) of RGBW are aligned in stripe shape.

In addition, the unit pixel UPX may be composed of what is called an RGB vertical stripe pixel in which three rectangular pixels (pixel electrodes) of general three primary colors RGB are aligned in stripe shape.

The unit pixel UPX may be composed of pixels of four or more colors including yellow pixels or including both the white pixels and the yellow pixels.

Furthermore, the unit pixel UPX may include a yellow pixel, a cyan pixel and a magenta pixel instead of the red pixel, the green pixel and the blue pixel.

In the above-described embodiment, the liquid crystal display panel PNL adopts the twisted nematic (TN) mode. However, the embodiment is not limited to this, but the liquid crystal display panel may adopt a display mode other than the TN mode. For example, the liquid crystal display panel may adopt an in-plane switching (IPS) mode which primarily uses a lateral electric field approximately parallel to the main substrate surface, such as a fringe field switching (FFS) mode.

The above-described embodiments are not limited to the above-explained liquid crystal display device, but can be applied to various liquid crystal display devices.

What is claimed is:

1. A liquid crystal display device, comprising:
a first substrate;
a second substrate including a color filter opposed to the first substrate; and
a liquid crystal layer held between the first substrate and the second substrate,
the first substrate including:
a stacked layer body including a light-reflecting layer, and a transparent conductive layer disposed on the light-reflecting layer;
an insulating layer disposed on the stacked layer body; and
a light-reflective first pixel electrode and a light-reflective second pixel electrode disposed closer to the liquid crystal layer than the stacked layer body,
the second pixel electrode being adjacent to the first pixel electrode and spaced from the first pixel electrode with a gap,
the color filter including:
a first color layer having a transmitted light spectrum indicating a light transmittance peak within a first wavelength range; and
a second color layer having a transmitted light spectrum indicating a light transmittance peak within a second wavelength range which is on a side of a long wavelength in view of the first wavelength range,
the first pixel electrode corresponding to the first color layer,
the second pixel electrode corresponding to the second color layer,
the gap being located just above the stacked layer body,
the stacked layer body and the insulating layer reflecting adjusted light obtained by adjusting light incident from the liquid crystal layer side to the liquid crystal layer side, and
the adjusted light having a reflected light spectrum indicating a light reflectance peak within an adjusted wavelength range between the first wavelength range and the second wavelength range.

2. The liquid crystal display device of claim 1, wherein the first wavelength range is higher than or equal to 380 nm and lower than 490 nm, and
the second wavelength range is higher than or equal to 590 nm and lower than or equal to 780 nm.

3. The liquid crystal display device of claim 1, wherein the insulating layer is formed of silicon nitride.

4. The liquid crystal display device of claim 1, wherein the light-reflecting layer is formed of a metal.

5. The liquid crystal display device of claim 4, wherein the light-reflecting layer is opposed to the first pixel electrode and the second pixel electrode, and maintained at a constant potential.

6. The liquid crystal display device of claim 1, wherein the first color layer opposed to the gap is opposed to any one of the first pixel electrode and the second pixel electrode, and
the second color layer opposed to the gap is opposed to the other of the first pixel electrode and the second pixel electrode.

7. The liquid crystal display device of claim 1, wherein a thickness of the insulating layer is in a range from 170 to 190 nm.

8. The liquid crystal display device of claim 1, wherein a thickness of the transparent conductive layer is in a range from 40 to 60 nm.

9. The liquid crystal display device of claim 1, wherein the first substrate includes a first switching element and a second switching element,
the first switching element is electrically connected to the first pixel electrode, and
the second switching element is electrically connected to the second pixel electrode.

10. The liquid crystal display device of claim 1, wherein the stacked layer body is in an electrically floating state.

* * * * *